United States Patent

[11] 3,530,899

[72] Inventors Dillard Breeding, deceased, late of Nashville, Tenn.
by Freida J. Breeding, executrix, Nashville, Tenn.
[21] Appl. No. 716,637
[22] Filed Mar. 27, 1968
[45] Patented Sept. 29, 1970
[73] Assignee Breeding Insulation Company, Inc., Nashville, Tenn., a corporation of Tennessee

[54] PROTECTIVE SHIELD FOR PIPE HANGER ASSEMBLY
1 Claim, 4 Drawing Figs.
[52] U.S. Cl. ............................................. 138/107, 248/62
[51] Int. Cl. ........................................... F16l 3/00
[50] Field of Search ........................................... 138/106, 107, 113, 143, 149; 248/62, 65, 74

[56] References Cited
UNITED STATES PATENTS
| | | | |
|---|---|---|---|
| 1,788,939 | 1/1931 | Axlund........................ | 138/106 |
| 1,860,203 | 5/1932 | Rishel........................ | 138/149X |
| 2,013,888 | 9/1935 | Keefe et al.................. | 138/113 |
| 2,047,778 | 7/1936 | Hayden...................... | 138/149X |
| 3,122,346 | 2/1964 | Seiler......................... | 138/107X |
| 3,233,699 | 2/1966 | Plummer..................... | 138/149X |
| 3,244,388 | 5/1966 | Coffman...................... | 138/107X |
| 3,415,474 | 10/1968 | Kindorf....................... | 248/62 |

Primary Examiner—Laverne D. Geiger
Assistant Examiner—Edward J. Earls
Attorney—Robert G. McMorrow ABSTRACT: In an overhead pipe assembly wherein the pipe is surrounded by tubular insulation of material subject to being cut, a section of preformed insulation of sectional form has a vapor barrier and a plate, the plate being affixed to one section of the preformed insulation, and tape wrappings secure the assembly in place.

Patented Sept. 29, 1970

3,530,899

INVENTOR.
DILLARD BREEDING,
BY
Robert G. McMorrow,
ATTORNEY.

PROTECTIVE SHIELD FOR PIPE HANGER ASSEMBLY

BACKGROUND OF THE INVENTION

1. Field of the Invention

This invention pertains to overhead pipe installations wherein the pipe is provided with a covering insulation, and to a means to prevent prevent damage to the insulation by the action of the hanging straps used to support the pipe.

2. Statement of the Prior Art

It has heretofore been proposed to provide sectional insulation, and to separately supply a saddle, or the like, formed of a rigid material, to resist the action of the pipe hanger on the insulation. Examples of such prior proposals are found in the following U.S. patents:

|  | Patent No. | Issue Date |
| --- | --- | --- |
| Patentee: |  |  |
| Seller | 3,122,346 | February 25, 1964. |
| Litz | 3,185,758 | May 25, 1965. |
| Coffman | 3,244,388 | April 5, 1966. |

SUMMARY OF THE INVENTION

The present invention provides a partially preassembled group of components which are adapted for rapid installation and which positively position the protective components in such manner as to obviate the likelihood of subsequent misalignment.

This invention comprehends the partial pre-assembly of sectional insulation halves which fit about a conduit pipe, or the like, the lower half having an elongated vapor barrier and a metallic plate permanently affixed thereto, the upper half being conformably shaped to fit over the pipe and be connected to the first, lower half, and the vapor barrier being extendible over the upper half when so connected. Two tapes are supplied for extention around the barrier and the halves when connected, and the plate is spaced inwardly of the ends of the halves so that the tapes do not contact the plate.

Advantages of this construction over those previously proposed reside chiefly in the ease and speed of installation made possible by the present arrangement, and the fact that the plate is not movable. With components as herein specified, installation by an unassisted mechanic is possible, whereas pre-existing types of saddles required two men for adequate mounting. The invention thereby reduces the overall cost of such installations while improving the finished quality of the work.

Other and further objects and advantages of the invention will become apparent to those skilled in the art from a consideration of the following specification when read in conjunction with the annexed drawing.

DESCRIPTION OF THE PREFERRED EMBODIMENT

Figure 3:
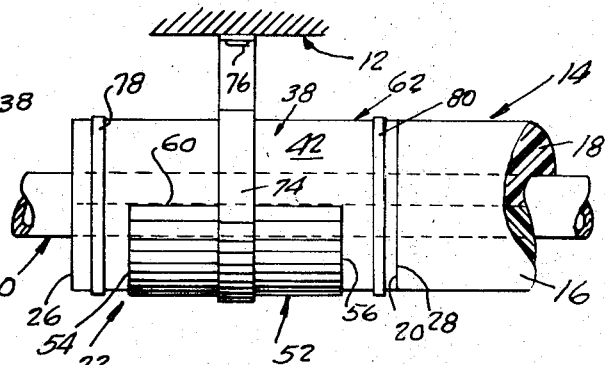
FIG. 3 is a side elevational view.

With more detailed reference to the drawing, a typical environment of use is shown in FIG. 3. There, a pipe 10, usually serving as a fluid conduit of some type, is mounted in overhead position suspended from a support 12. The apparatus of this invention is directed to the provision of a partially pre-assembled means for preventing damage to insulation at those points whereas the pipe 10 and its insulation are suspended from the overhead support 12. The pipe is covered, throughout its extent, by elongated sections of insulation 14, often formed of foam, plastic, or the like, and applied in halves 16, 18 adhesively secured about the pipe 10 by a suitable mastic substance.

The insulation sections 14 are interrupted for a given length at those locations selected for suspension of the pipe from the overhead support. At such interrupted locations, the sections terminate at section ends 20.

Figure 2:
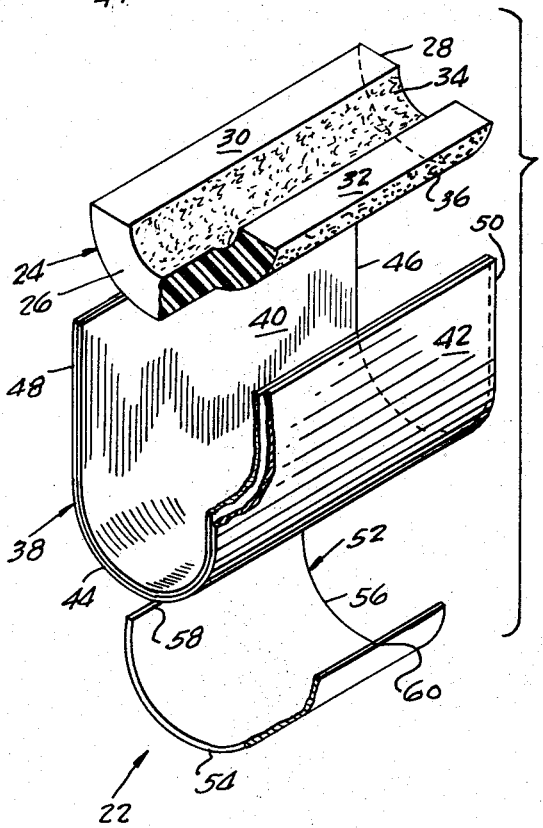
FIG. 2 is a further disassembled view, partially broken away.
Figure 4:
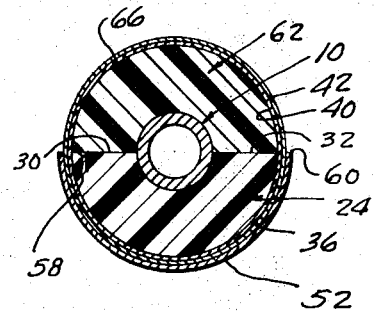
FIG. 4 is a transverse cross-sectional view.

The invention apparatus is generally identified in the drawing by reference character 22. The apparatus 22 includes a section of insulation of a length substantially equal to the given length of interruption of the sections 14. Each section includes a first, lower insulation half 24 of said length between its ends 26, 28, and having spaced inner faces 30, 32 separated by a longitudinal inner groove 34. The groove 34 is dimensioned to fit about substantially one-half of the pipe 10. As shown in FIG. 2, the insulation half 24 is formed of a foam plastic, or like insulating material. The half 24 has a rounded outer surface 36 which corresponds with the adjacent surface of the half 16 of the section 14.

Figure 1:
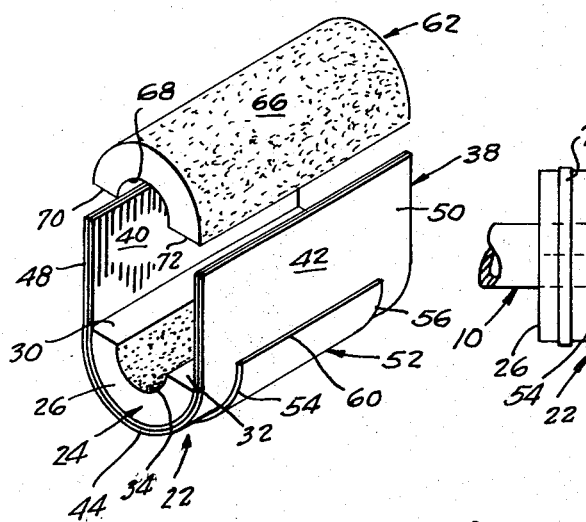
FIG. 1 is a partially disassembled perspective view showing a shield assembly as herein proposed.

Permanently affixed during manufacture to the outer surface 36 of the lower half 24 is an enlarged, substantially rectangular sheet 38 of vapor barrier material. The sheet 38 is of two-ply construction, including an inner ply 40 of metallic foil, and an outer ply 42 of fibrous material. The sheet is of a length between its end edges 44, 46 substantially equal to the length of the first half 24. As shown in FIG. 1, the sheet is secured, as by use of a suitable mastic, to the half 24 in a manner such that its extended end flaps 48, 50 project upwardly on each side of the lower half. The sheet 52, and the flaps 48, 50, are relatively flexible, and may be bent about as required during installation.

A rigid plate 52 of pre-bent form comprises an important component of the apparatus 22. The plate is semicircular in end elevation, and is of a length between its ends 54 and 56 substantially less than the length of the half 24. The plate is affixed, as by mastic, on the outer layer 42 of the barrier 38 at a location spaced between the ends thereof whereby open areas are provided on either side of the plate. The plate also has side edges 58, 60 which are laterally aligned with the inner faces 30, 32 when the plate is in place.

The apparatus 24 further includes a second, upper insulation half 62 identical to the first half 24 and having an outer surface 66, pipe receiving groove 68, and interior faces 70, 72. The interior faces 70, 72 mate with and may optionally be adhesively secured to, the inner faces 30, 32 respectively, of the first half 24.

Connection of the assembly in place in a pipe system involves the use of a hanger strap 74 which is secured by a suitable fastener 76 on the overhead support 12.

Installation of the apparatus involves the placement of the lower half 24 against the pipe 10 in the groove 34 at one of the aforesaid interrupted locations, wherein its ends 26 and 28 abut against adjacent sections 14 of the pipe insulation. The upper half 62 is then positioned, and the flaps 48 and 50 of the vapor barrier are positioned thereover. The faces of the sections may be precoated with an adhesive if required. The inward spacing of the ends of the plate permits the machanic to apply wrappings 78, 80 of tape (FIG. 3) where this is deemed desirable.

The plate is so positioned as to underlie the strap 74, thereby preventing any contact between the strap and the relatively soft insulation material or the vapor barrier.

What is claimed:

1. In a substantially horizontally extending conduit pipe installation which includes a tubular insulation about said conduit pipe, a hanger assembly comprising:

first and second insulation halves formed of soft foam plastic and being of a given length from end-to-end said first and second insulation halves having spaced interfaces with a longitudinal semicircular groove therebetween shaped to fit about substantially one-half of the conduit pipe and having an outer surface; said tubular insulation being interrupted at at least one location, the space of interruption being substantially equal to the length of said halves and the ends of said halves abutting said insulation;

a vapor barrier sheet of substantially rectangular form secured to the outer surface of the lower insulation half, the sheet being of two-ply construction and having an inner foil layer and an outer fibrous layer; the sheet being coextensive in length with the first insulation half and covering said outer surface of said first insulation half, said sheet further providing, when connected to said first insulation half, upwardly extending flaps, said flaps being bendable to a position to cover the outer surface of both of said first and second insulation halves when said spaced inner faces are adjacent each other;

a metallic plate adhesively secured to the sheet in a central location, the plate being of a length substantially less than the said length of the insulation halves, the plate having side edges and being of a width from edge to edge such that the edges are laterally aligned with the inner face of the first half; and a suspended hanger strip underlying the metallic plate, the soft lower insulation half and vapor barrier sheet being protected against damage from said strap by said metallic plate.